United States Patent [19]

Ono et al.

[11] 4,160,012

[45] Jul. 3, 1979

[54] PROCESS OF REFINING SODIUM HEXAFLUOROSILICATE CONTAINING GYPSUM

[75] Inventors: Tetsuhiro Ono; Minoru Aramaki; Tamotsu Mizuno; Masao Fujinaga, all of Ube, Japan

[73] Assignee: Central Glass Company, Limited, Ube, Japan

[21] Appl. No.: 856,134

[22] Filed: Nov. 30, 1977

[30] Foreign Application Priority Data

Dec. 3, 1976 [JP] Japan ............................ 51-144697

[51] Int. Cl.$^2$ ............................................ C01B 33/10
[52] U.S. Cl. .................................. 423/341; 423/158; 423/184
[58] Field of Search ............... 423/341, 155, 158, 164, 423/165, 179, 184, 208

[56] References Cited

U.S. PATENT DOCUMENTS

| | | | |
|---|---|---|---|
| 2,354,177 | 7/1944 | Kawecki | 423/341 |
| 3,055,733 | 9/1962 | Lang et al. | 423/341 |
| 3,795,728 | 3/1974 | Scheel | 423/341 X |
| 3,915,659 | 10/1975 | Kadotani et al. | 423/341 X |

Primary Examiner—Edward J. Meros
Attorney, Agent, or Firm—Fleit & Jacobson

[57] ABSTRACT

Crude sodium hexafluorosilicate containing gypsum as a principal impurity can be refined economically with a minimized loss of fluorine by first making the crude fluorosilicate in the form of an aqueous slurry react with an alkali metal compound such as sodium carbonate or sodium hydroxide to form a soluble sulfate, and then treating the solid component of the reaction product with an acid solution in the presence of sodium ion, preferably at elevated temperatures near boiling point, to form a soluble calcium salt and crystallize sodium hexafluorosilicate. Sea water may be used both as the aqueous medium for the slurry in the first step and as the source of the sodium ions in the second step.

9 Claims, 2 Drawing Figures

PROCESS OF REFINING SODIUM HEXAFLUOROSILICATE CONTAINING GYPSUM

BACKGROUND OF THE INVENTION

This invention relates to a process for refining of a crude sodium hexafluorosilicate containing gypsum as a principal impurity.

The most prevailing method for industrial preparation of sodium hexaflurosilicate (sodium silicofluoride) is the neutralization of hexafluorosilicic acid obtained as a by-product of the preparation of wet process phosphoric acid with a sodium compound such as sodium hydroxide, sodium carbonate or sodium chloride.

It is no exaggeration to say that sodium hexafluorosilicate obtained by this method always contains a substantial amount of calcium sulfate dihydrate or gypsum as a principal impurity due to the presence of gypsum either dissolved or suspended in a phosphoric acid solution used as the starting material. It is practically impossible to completely remove solid phase gypsum from either a phosphoric acid solution or a hexafluorosilicic acid solution by means of an industrial filter. Even if an ideal filtration were realized, crystallization of gypsum from the filtrate at the stage of precipitation of sodium hexafluorosilicate by the neutralization is inevitable. In industrial preparation of sodium hexafluorosilicate from wet process phosphoric acid, therefore, it is next to impossible to preclude the presence of gypsum in the product.

In addition, sodium hexafluorosilicate of this origin usually contains impurity metal elements such as iron and aluminum in the form of insoluble and sparingly soluble phosphates since these elements are usually dissolved in the starting phosphoric acid solution.

In recent years increasing attention has been focused on sodium hexafluorosilicate as an industrially important fluorine source with development of practicable processes for the preparation of important fluorides exemplified by synthetic cryolite and aluminum fluoride from the fluorosilicate, and accordingly there is an eager demand for industrial supply of refined sodium hexafluorosilicate of which impurity content is small enough to give an intended fluoride with satisfactorily high purity. Since prevention of the inclusion of gypsum in sodium hexafluorosilicate is practically impossible, the demand must be met by refining of an industrially obtained crude sodium hexafluorosilicate.

U.S. Pat. No. 3,055,733 discloses that crude sodium hexafluorosilicate of 94–97% purity can be purified to the extent of 98–99% by repulping at 80° C. using phosphoric acid (of 30% $P_2O_5$) and 13% hexafluorosilicic acid solution each in the same weight as the crude fluorosilicate. However, this method will be disadvantageous from the economical viewpoint because of the consumption of costly phosphoric acid and hexafluorosilicic acid in large amounts. Besides, the repulping at a temperature as high as 80° C. may present a problem about the material of the repulping apparatus. U.S. Pat. No. 3,915,659 discloses a refining process in which crude sodium hexaluorosilicate is repulped with a sodium chloride solution to selectively remove gypsum based on a difference in solubility. This process is easy to practise but has the disadvantage of requiring the disposal of an immense quantity of waste water resulting from the use of the sodium chloride solution in a very large quantity, accompanied by a considerable loss of sodium hexafluorosilicate during the treatment.

SUMMARY OF THE INVENTION

It is an object of the present invention to provide an improved process for refining of a crude sodium hexafluorosilicate containing gypsum as a principal impurity, which process can be practised by the use of relatively cheap materials with minimized discharge of waste water and minimized loss of the fluorosilicate.

According to the invention, refining of a crude sodium hexafluorosilicate containing gypsum is achieved by the following procedures. First the crude fluorosilicate is dispersed in either plain water or sea water, and an alkali metal compound is added to the resultant aqueous slurry to cause a decomposition reaction through which the sulfuric acid radical of the gypsum combines with the alkali metal to form a soluble sulfate. Then the reaction system is filtered and the solid component is washed with a small quantity of water to remove sulfuric acid ions completely. Thereafter the solid component is treated with an aqueous solution of an acid, which can form a water soluble calcium salt, in the presence of sodium ions to crystallize sodium hexafluorosilicate and remove calcium through the formation of a soluble calcium salt.

The use of either sodium carbonate or sodium hydroxide as the alkali metal compound in the first step is preferred, but other water soluble basic compounds such as sodium hydrogen carbonate, potassium carbonate, potassium hydrogen carbonate, potassium hydroxide and lithium hydroxide are also useful. Besides, there is a possibility of using aqueous ammonia in place of an alkali metal compound. Hydrochloric acid is preferred as the acid in the last step, but nitric acid too is of use. Besides, the use of a certain organic acid such as acetic acid will be possible. Preferably sodium chloride is used as the source of sodium ions in the last step, but sodium hydroxide too is of use.

It is profitable to use sea water both as the aqueous medium for preparing the fluorosilicate slurry in the first step and as the source of sodium ions in the last step.

Preferably, the first decomposition reaction and the later acid treatment, particularly the latter, are accomplished at elevated temperatures.

A process according to the invention is quite suitable for application to a crude sodium hexafluorosilicate obtained by neutralization of wet process phosphoric acid with a sodium compound. The fluorosilicate of this origin usually contains, other than gypsum, some phosphates including insoluble or sparingly soluble ones such as iron phosphate, aluminum phosphate, and/or complexes of these salts, and soluble ones such as sodium dihydrogen phosphate and disodium hydrogen phosphate. In general, this fluorosilicate comprises on the dry basis 70–95 Wt% $Na_2SiF_6$, 3–25 Wt% $CaSO_4$ and 0.5–3 Wt% phosphates as $P_2O_5$. According to the invention, not only the gypsum of such a large amount but also the phosphates can be removed practically completely (phosphorus matter is removed mainly at the crystallization of the fluorosilicate from the acid-containing solution): $CaSO_4$ can be made less than 0.1 Wt% and $P_2O_5$ less than 0.01 Wt%.

From an economical point of view, a process of the invention is advantageous in that the chemicals consumed in the process are all cheap ones and that the process can be practised with discharge of only a very small quantity of waste water (the liquid component of the first decomposition product, the mother liquor from which the refined fluorosilicate crystallized and washing water). Furthermore, the loss of fluorine value through this refining process is very small: it can be made less than 1 g/l for the mother liquor at each stage.

DESCRIPTION OF PREFERRED EMBODIMENTS

In the description hereinafter, percentages are given all by weight.

A decomposition reaction between calcium sulfate dihydrate (gypsum) and sodium hexafluorosilicate may be expressed as follows:

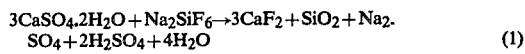

$$3CaSO_4.2H_2O + Na_2SiF_6 \rightarrow 3CaF_2 + SiO_2 + Na_2SO_4 + 2H_2SO_4 + 4H_2O \quad (1)$$

However, this reaction does not occur actually. In the present invention, a basic alkali metal compound is added to an aqueous slurry of a crude sodium hexafluorosilicate with the intention of shifting the equilibrium of the reaction system of Equation (1) from the left hand side to the right hand side through neutralization of $H_2SO_4$ on the right hand side. An alkali metal compound is used as the neutralization agent because it is a requisite that the product of neutralization be a water soluble sulfate. When sodium carbonate is used as a preferred example of the neutralizing alkali metal compound, gypsum contained in the crude fluorosilicate reacts with a portion of the fluorosilicate according to Equation (2).

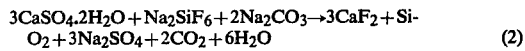

$$3CaSO_4.2H_2O + Na_2SiF_6 + 2Na_2CO_3 \rightarrow 3CaF_2 + SiO_2 + 3Na_2SO_4 + 2CO_2 + 6H_2O \quad (2)$$

It is presumed that the fluorosilicate reacts with sodium carbonate as expressed by Equation (3) to form sodium fluoride, which is somewhat soluble in water, if there is an excess of sodium carbonate with respect to the reaction of Equation (2).

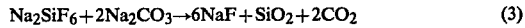

$$Na_2SiF_6 + 2Na_2CO_3 \rightarrow 6NaF + SiO_2 + 2CO_2 \quad (3)$$

However, we have confirmed experimentally that the reaction of Equation (3) does not occur even in the presence of excess sodium carbonate insofar as the pH of the reaction system is not larger than 7.

Figure 1:
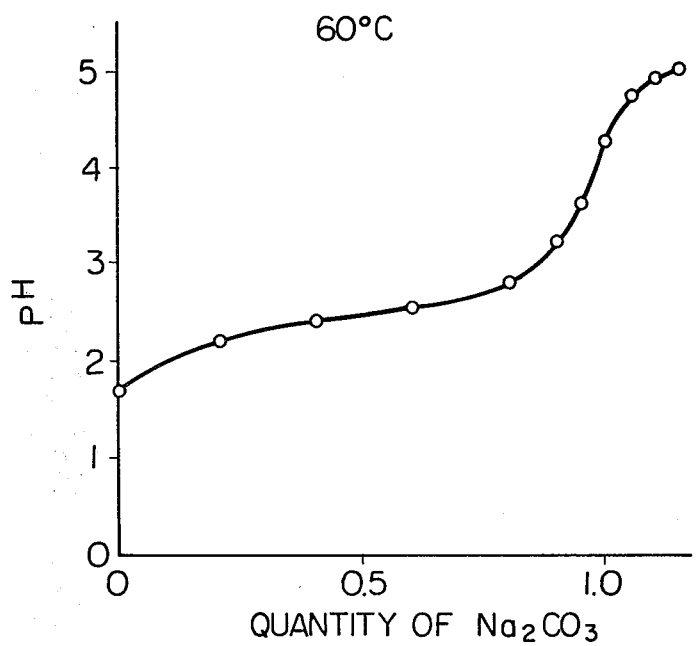
FIG. 1 is a graph showing the relationship between the amount of sodium carbonate in a reaction system at the first decomposition step of a process of the invention and the pH of the reaction system.
Figure 2:
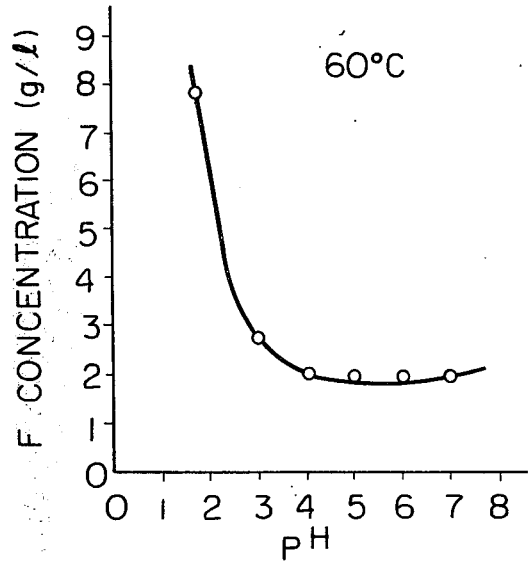
FIG. 2 is a graph showing the relationship between the pH and fluorine concentration for the same reaction system.

In our experiment, $CaSO_4.2H_2O$ and $Na_2SiF_6$ were dispersed in water in the proportion according to Equation (2) to give a slurry, and 20% aqueous solution of $Na_2CO_3$ was added to this slurry in various quantities, maintaining the slurry at a temperature of 60° C. The pH of the slurry varied with increased addition of the sodium carbonate solution as shown in FIG. 1. The quantities of sodium carbonate on the abscissa are relative values taking a stoichiometric quantity according to Equation (2) as 1.0. As can be seen in FIG. 1, the pH of the slurry exhibited a slow rise with increase in the quantity of the added sodium carbonate while the quantity was far from sufficiently but steeply increased from about 2.5 to about 4.5 when the quantity of the sodium carbonate was increased across the stoichiometric value. This means that the decomposition reaction according to Equation (2) was completed while the pH exhibited this steep change. In this experiment, the variation in the fluorine concentration in the slurry with respect to the pH was as shown in FIG. 2. The fact that little variation in the fluorine concentration was observed over the pH range of about 4–7 implies that the fluorosilicate was not decomposed by an excess portion of the sodium carbonate. This is quite favorable for thorough removal of $SO_4$ through formation of soluble sodium sulfate without a substantial loss of the fluorosilicate.

Judging from the experimental result, the quantity of an alkali metal compound added to the crude fluorosilicate slurry is made preferably 0.8–1.5 times a stoichiometric quantity for complete decomposition of gypsum contained in the crude fluorosilicate (according to Equation (2) in the case of using sodium carbonate) and neutralization of the resultant sulfuric acid so that the pH of the mother liquor after completion of the decomposition reaction may range from about 4 to about 7.

Furthermore, FIG. 2 shows that the fluorine concentration in the mother liquor after completion of the decomposition according to Equation (2) was about 2 g/l which is far lower than a fluorine concentration calculated from the solubility (7.7 g/l) of $Na_2SiF_6$ in water at 60° C. A salting-out effect of $Na_2SO_4$ formed by the reaction (2) is considered to be a main reason for such a low fluorine concentration. The use of sea water for preparing a crude sodium hexafluorosilicate slurry (to which an alkali metal compound is added) is advantageous since in this case the fluorine concentration in the mother liquor after completion of the decomposition reaction can be still lowered to the extent of less than 1 g/l, meaning the success in minimizing the loss of fluorine value.

The reaction of Equation (2) proceeds even at room temperature, but in practice it is preferable to perform the treatment represented by Equation (2) at elevated temperatures between about 50° C. and about 80° C.

After completion of the above described decomposition reaction, the removal of $SO_4$ is completed by filtration of the reaction system by means of an ordinary filter and washing of the solid component with water which may be sea water. The solid component comprises $CaF_2$ and $SiO_2$, so that an acid treatment of the washed solid component in the presence of sodium ions causes decomposition of $CaF_2$ and formation of $Na_2SiF_6$. To achieve the separation of Ca from $Na_2SiF_6$ precipitated by this treatment, it is a requisite to use an acid which can form a water soluble calcium salt. As mentioned hereinbefore, the use of hydrochloric acid is preferred because of a high solubility of calcium chloride. When sodium chloride is used as the source of sodium ions, the treatment of the aforementioned solid component with hydrochloric acid is expressed by Equation (4):

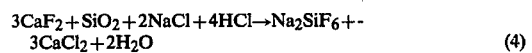

$$3CaF_2 + SiO_2 + 2NaCl + 4HCl \rightarrow Na_2SiF_6 + 3CaCl_2 + 2H_2O \quad (4)$$

The quantity of the acid should be in excess of a stoichiometric quantity for completely decomposing $CaF_2$ contained in the treated solid material. It is preferable that the quantity of the acid is at least about 1.3 times the stoichiometric quantity. In practice, the washed mixture of $CaF_2$ and $SiO_2$ is dispersed in an aqueous solution of sodium chloride to give a slurry and the acid is added to this slurry as an aqueous solution. In this case it is advantageous to use sea water as the sodium chloride solution.

The reaction of Equation (4) proceeds readily and can be completed within about 30 min. However, it is preferable to maintain the reaction system at elevated temperatures between about 80° C. and the boiling point of the reaction system for several hours from the start of the reaction because then crystallization of pure sodium hexafluorosilicate can be completed while, besides the gypsum, phosphorus and various metals contained in the crude fluorosilicate in the form of insoluble or sparingly soluble compounds also remain dissolved in the mother liquor. Thus a well refined sodium hexafluorosilicate can be obtained by a process of the invention, which is economical and easy to put into industrial practice, without the need of any extra treatment.

The following examples are presented for further illustration of a refining process according to the invention.

EXAMPLE 1

A crude sodium hexafluorosilicate containing 17.70% $CaSO_4 \cdot 2H_2O$ on the dry basis and 19.7% of adhesive moisture was treated in this example. Analytical values for this material on the dry basis were:

| | |
|---|---|
| Ca | 4.12% |
| $SO_4$ | 9.88% |
| $P_2O_5$ | 3.00% |
| F | 47.65% |

In a stainless vessel which was 3 liters in capacity and equipped with a stirrer, 1211 g of the crude fluorosilicate was dispersed in 1000 g of water (plain water). The resultant aqueous slurry was heated to 80° C., and 385 g of 20% aqueous solution of sodium carbonate was added slowly (in 30 min) to the slurry with continued stirring at this temperature to cause the reaction of Equation (2). The pH of the reaction system was 4.5. Thereafter the solid component of the reaction system was filtered off by the use of a Buchner funnel and washed with 500 g of water. As the result, a wet cake (20% adhesive moisture) weighing 1000 g was obtained with the following analytical values (dry basis).

| | |
|---|---|
| Ca | 5.00% |
| $SO_4$ | 0.15% |
| $P_2O_5$ | 0.20% |
| F | 57.10% |

This cake was put into a stainless steel reaction vessel equipped with a reflux condenser together with 1 liter of 50 g/l aqueous solution of NaCl and 211 g of 30% aqueous HCl solution and subjected to boiling at 100° C. for 9 hr to complete the reaction of Equation (4). The solid matter in the resultant solution was filtered out and washed with 500 g of water. The product weighed 878 g in a wet state with 15% adhesive moisture. Analytical values (dry basis) were as follows and the overall yield of product based on fluorine was 96.8%

| | |
|---|---|
| Ca | trace |
| $SO_4$ | 0.05% |
| $P_2O_5$ | 0.007% |
| F | 60.1% |
| ($Na_2SiF_6$ | 99.1%) |

EXAMPLE 2

The treatment of the crude sodium hexafluorosilicate with the 20% aqueous solution of sodium carbonate in Example 1 was repeated identically except that 1000 g of sea water was used (in place of the plain water in Example 1) for preparing the fluorosilicate slurry and that the washing of the filtered solid matter was performed with 500 g of sea water. The pH of the mother liquor was 4.7. A resultant wet cake weighed 1011 g including 20% adhesive moisture and gave the following analytical values.

| | |
|---|---|
| Ca | 4.96% |
| $SO_4$ | 0.20% |
| $P_2O_5$ | 0.21% |
| F | 57.08% |

In a stainless steel reaction vessel equipped with a reflux condenser, this cake dispersed in 2 liters of sea water (containing 25 g/l of NaCl), added with 211 g of 30% aqueous solution of HCl, and the mixture was boiled for 10 hr at 100° C. Then the solid matter was filtered off with a Buchner funnel and washed with 500 g of plain water. The weight of the resulting sodium hexafluorosilicate cake was 889 g including 15% adhesive moisture, and analytical values (dry basis) were as follows. The overall yield of product based on fluorine was 98.2%.

| | |
|---|---|
| Ca | trace |
| $SO_4$ | 0.06% |
| $P_2O_5$ | 0.005% |
| F | 60.2% |
| ($Na_2SiF_6$ | 99.3%) |

EXAMPLE 3

The crude sodium hexafluorosilicate in Example 1 was dispersed in 1000 g of plain water using the same vessel as in Example 1. The resultant slurry was heated to 60° C., and 121 of 48% aqueous solution of sodium hydroxide was added slowly (in 30 min) to the slurry with contined stirring at this temperature. The pH of the reaction system became 6.0. Then the reaction system was filtered by the use of a Buchner funnel, followed by washing of the solid component with 500 g of plain water. A resultant wet cake weighed 1000 g, including 20% adhesive moisture, and gave the following analytical values.

| | |
|---|---|
| Ca | 4.96% |
| $SO_4$ | 0.17% |
| $P_2O_5$ | 0.18% |
| F | 57.02% |

This cake was made to react with sodium chloride and hydrochloric acid in the same manner as in Example 1 except that the boiling time was extended to 10 hr, followed by filtration of the reaction system and washing of the solid matter with 500 g of water. As the result, a wet cake (with 15% adhesive moisture) of sodium hexafluorosilicate weighing 877 g was obtained with a 96.7% overall yield based on fluorine and the following analytical values (dry basis).

| | |
|---|---|
| Ca | trace |
| $SO_4$ | 0.05% |
| $P_2O_5$ | 0.008% |
| F | 60.3% |
| ($Na_2SiF_6$ | 99.4%) |

What is claimed is:

1. A process of refining a crude sodium hexafluorosilicate containing calcium sulfate as an impurity, comprising the steps of:
   (a) preparing an aqueous slurry of the crude sodium hexafluorosilicate;
   (b) adding an alkali metal compound, which can neutralize sulfuric acid and which is selected from the group consisting of sodium hydroxide, sodium carbonate, sodium hydrogen carbonate, potassium hydroxide, potassium carbonate, potassium hydrogen carbonate and lithium hydroxide, to said slurry to form a solid phase consisting essentially of calcium fluoride and silicon dioxide through decomposition of sodium hexafluorosilicate and calcium sulfate accompanied by the formation of a water soluble sulfate by neutralization of sulfuric acid formed during said decomposition with said alkali metal compound;
   (c) separating said solid phase from the product of step (b);
   (d) making said solid phase react with an acid, which can form a water soluble calcium salt, in an aqueous solution comprising sodium ions; and
   (e) recovering solid phase sodium hexafluorosilicate from the product of step (d).

2. A process as claimed in claim 1, wherein the quantity of said alkali metal compound is about 0.8 to about 1.5 times as large as a stoichiometric quantity for neutralization of a stoichiometric quantity of said sulfuric acid formed during said decomposition in step (b) such that the pH of the reaction system at the end of step (b) ranges from about 4 to about 7.

3. A process as claimed in claim 2, wherein the quantity of said acid in step (d) is at least about 1.3 times as large as a stoichiometric quantity for a complete conversion of calcium fluoride contained in said solid phase into said water soluble calcium salt.

4. A process as claimed in claim 3, wherein step (d) is performed at temperatures between about 80° C. and the boiling point of the reaction system.

5. A process as claimed in claim 1, wherein said acid in step (d) is selected from the group consisting of hydrochloric acid and nitric acid.

6. A process as claimed in claim 5, wherein said aqueous solution in step (d) is selected from a sodium chloride solution and a sodium hydroxide solution.

7. A process as claimed in claim 6, wherein said aqueous slurry in step (a) is a dispersion of the crude sodium hexafluorosilicate in sea water.

8. A process as claimed in claim 7, wherein said aqueous solution in step (d) is sea water.

9. A process as claimed in claim 6, further comprising the step of washing said solid phase with water after step (c) but before step (d).

* * * * *